United States Patent
Peterson et al.

(10) Patent No.: US 10,149,274 B1
(45) Date of Patent: Dec. 4, 2018

(54) SYSTEM AND METHOD FOR DETERMINING GEOLOCATION OF WIRELESS ACCESS POINT OR WIRELESS DEVICE

(71) Applicant: OPEN INVENTION NETWORK LLC, Durham, NC (US)

(72) Inventors: Robert W. Peterson, Plano, TX (US); Mark Gerard, McKinney, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 15/723,548

(22) Filed: Oct. 3, 2017

Related U.S. Application Data

(63) Continuation of application No. 15/445,653, filed on Feb. 28, 2017, now Pat. No. 9,781,699, which is a continuation of application No. 15/070,668, filed on Mar. 15, 2016, now Pat. No. 9,591,457, which is a continuation of application No. 14/720,798, filed on May 24, 2015, now Pat. No. 9,288,618, which is a continuation of application No. 13/078,936, filed on Apr. 2, 2011, now Pat. No. 9,055,408.

(51) Int. Cl.
*H04W 24/00* (2009.01)
*H04W 64/00* (2009.01)
*H04W 84/12* (2009.01)
*H04W 88/08* (2009.01)

(52) U.S. Cl.
CPC .......... *H04W 64/003* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,813,503 B1* | 11/2004 | Zillikens | G08G 1/0962 455/456.1 |
| 7,769,393 B2* | 8/2010 | Jendbro | G01S 19/05 342/357.46 |
| 8,126,438 B2* | 2/2012 | Luo | H04W 4/02 455/414.1 |
| 8,879,540 B1* | 11/2014 | Martin | H04W 4/22 370/352 |
| 8,942,221 B2* | 1/2015 | McCann | H04W 48/12 370/349 |
| 9,042,917 B2* | 5/2015 | Edge | H04W 64/00 342/453 |
| 2006/0015725 A1* | 1/2006 | Voice | H04L 63/0245 713/168 |
| 2009/0011774 A1* | 1/2009 | Shan | G01S 5/0036 455/456.1 |

(Continued)

*Primary Examiner* — Shantell L Heiber

(57) ABSTRACT

In order to determine the location of wireless network devices without inherent location capabilities, a wireless network device such as an access point can receive geolocation information from transient data sources such as mobile devices requiring network access from the access point. The access point stores geolocation records including location coordinates received from the transient data sources. The geolocation records can be processed to determine the position and movement of the access point. The geolocation records and/or location information can be passed to other transient clients that do not have inherent location capability.

20 Claims, 2 Drawing Sheets

(56) References Cited

U.S. PATENT DOCUMENTS

2009/0125228 A1* 5/2009 Dicke .................... G01C 21/20
701/533
2010/0015999 A1* 1/2010 Belz ...................... G01S 5/0063
455/456.2
2011/0176523 A1* 7/2011 Huang ...................... G01S 5/02
370/338

* cited by examiner

SYSTEM AND METHOD FOR DETERMINING GEOLOCATION OF WIRELESS ACCESS POINT OR WIRELESS DEVICE

CROSS REFERENCE TO RELATED APPLICATIONS

This application is a continuation of U.S. Ser. No. 15/445,653, entitled SYSTEM AND METHOD FOR DETERMINING GEOLOCATION OF WIRELESS ACCESS POINT OR WIRELESS DEVICE, filed on Feb. 28, 2017, now issued U.S. Pat. No. 9,781,699, issued on Oct. 3, 2017, which is a continuation of U.S. Ser. No. 15/070,668, entitled SYSTEM AND METHOD FOR DETERMINING GEOLOCATION OF WIRELESS ACCESS POINT OR WIRELESS DEVICE, filed on Mar. 15, 2016, now issued U.S. Pat. No. 9,591,457, issued on Mar. 7, 2017, which is a continuation of U.S. Ser. No. 14/720,798, entitled SYSTEM AND METHOD FOR DETERMINING GEOLOCATION OF WIRELESS ACCESS POINT OR WIRELESS DEVICE, filed on May 24, 2015, now issued U.S. Pat. No. 9,288,618, issued on Mar. 15, 2016, which is a a continuation of U.S. Ser. No. 13/078,936, entitled SYSTEM AND METHOD FOR DETERMINING GEOLOCATION OF WIRELESS ACCESS POINT OR WIRELESS DEVICE, filed on Apr. 2, 2011, now issued U.S. Pat. No. 9,055,408, issued on Jun. 9, 2015, incorporated herein by reference in their entirety.

FIELD OF THE INVENTION

This disclosure relates to wireless network devices and in particular to location based services on wireless network devices.

BACKGROUND OF THE INVENTION

Some devices involved in a wireless network lack the hardware needed to find their location, e.g., most commercial WiFi access points lack GPS receivers, or even the ability to store manually specified geolocation coordinates. As a result, a device with WiFi networking capability cannot currently retrieve location information from a WiFi access point.

Most devices that need to know their location contain a GPS receiver and supporting software. The GPS hardware and software add to the cost of the device, and successfully establish a current location only if the GPS receiver can successfully receive the numerous satellite signals needed to establish a location fix. Other devices support manual specification of the device's geolocation coordinates. A limited number of mobile devices establish a current location fix using technologies other than GPS, e.g., dead reckoning from a known location, or establishing a connection to a WiFi access point whose location appears in a location database.

Devices that could benefit from knowing their own geolocation lack the ability. Applications, such as migratable agent applications, which may be running on a different device and which may be dependent on knowing their own location don't work when migrated because the device is ignorant of its location. Identifying a WiFi access point's location based on a database query provides an accurate location only when the access point has been entered into the database and hasn't moved since the last database update. Accessing the database requires either substantial on-device storage, or access to the Internet.

What is required is an improved system and method for determining locations of wireless devices and/or wireless access points.

SUMMARY OF THE INVENTION

In one aspect of the disclosure, there is provided a method for determining location. Geolocation information may be received into a wireless network device from one or more location aware transient data sources. The wireless network device may process geolocation records pertaining to the geolocation information to determine a geolocation, for example of the wireless network device.

In one aspect of the disclosure, there is provided a wireless access point configured to provide wireless network access to one or more wireless devices comprising one or more transient data sources and one or more transient data clients. The wireless access point comprises a location history manager configured to receive geolocation information from at least one transient data sources and store one or more geolocation records pertaining to the received geolocation information.

In one aspect of the disclosure, there is provided a method for determining the location of a wireless device. Initially, the wireless device accesses an access point and requests one or more geolocation records from the access point. The wireless device processes the geolocation records to calculate a geolocation of the wireless device.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
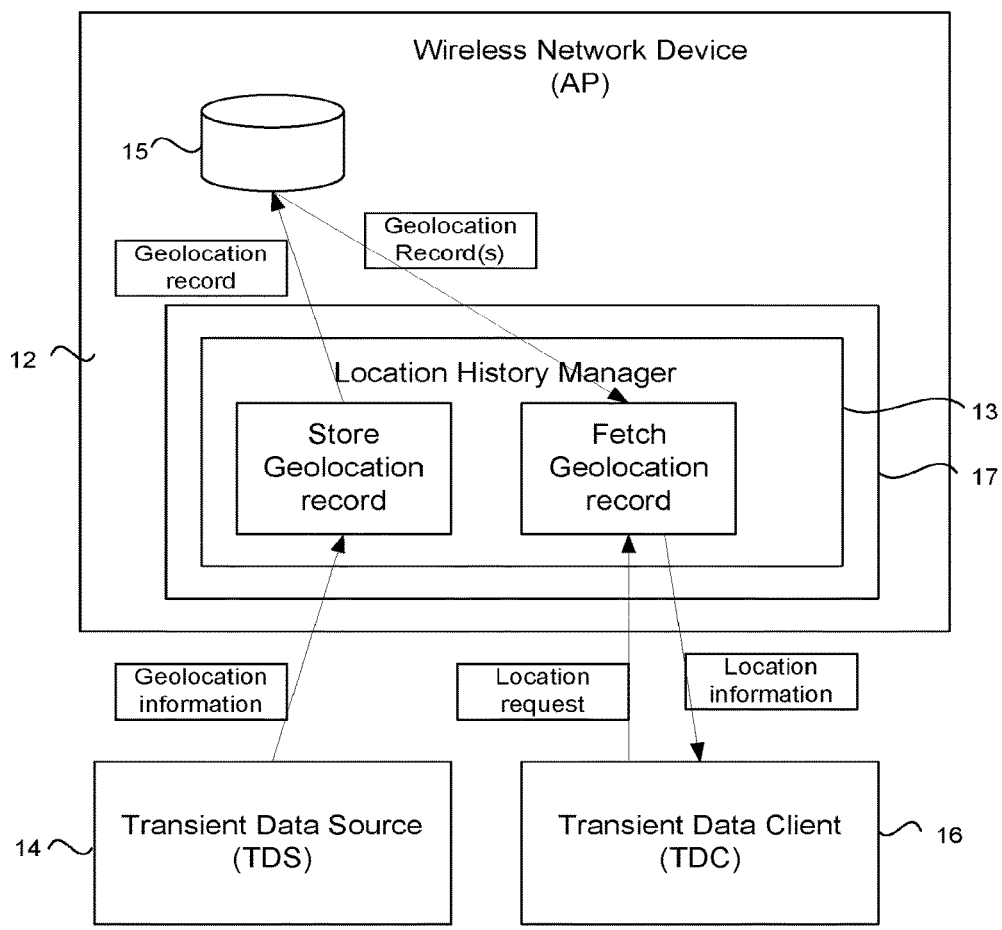
FIG. 1 schematically represents devices within a wireless network.

In FIG. 1, there is shown a network device 12 that is able to communicate with one or more other wireless network devices 14, 16. In one embodiment, the network device 12 may be a wireless access point that provides network access to the wireless network devices 14, 16 when the wireless network devices 14, 16 are "nearby". Thus the wireless devices 14, 16 may be considered to be transient clients of the network device 12. While the network device 12 will be referred to herein as an access point, other arrangements, such as peer-to-peer arrangements will be apparent to a person skilled in the art.

In the foregoing description, the wireless network devices 14 will be considered to be location aware devices, e.g. by virtue of an in-built GPS capability, a tracking capability, or other location aware mechanism. The specific mechanism by which the devices 14 are location aware is not considered to be pertinent to the present disclosure. The wireless network devices 14 will be referred to herein as transient data sources, that is, they provide a source of data to the network device 12. The wireless devices 16 will be considered to be location unaware devices and will be referred to herein as transient data clients, that is, they receive data from the network device 12. In embodiments of the invention, the transient data source 14 and/or the transient data client 16 may include one or more of a cellular telephone handset, a laptop or handheld computer, or similar devices with WiFi and with or without GPS capabilities.

Figure 2:
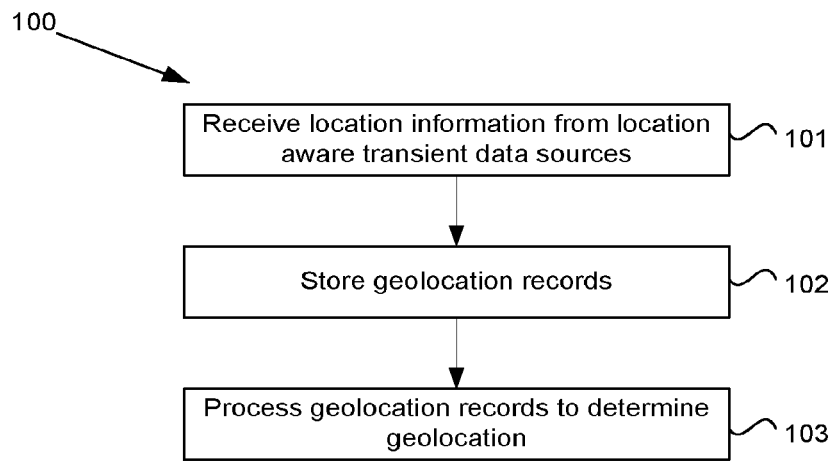
FIG. 2 depicts a method for determining geolocation of a device of the network.

A method for determining location is depicted in the flowchart 100 of FIG. 2. At step 101, the access point 12 receives geolocation information from location aware transient data sources 14. At step 102, the access point 12 stores geolocation records pertaining to the geolocation information. At step 103, the geolocation records are processed, e.g. by the access point 12 or by a transient data client 16 to which the geolocation records have been provided, in order to determine a geolocation of the respective device.

Figure 3:
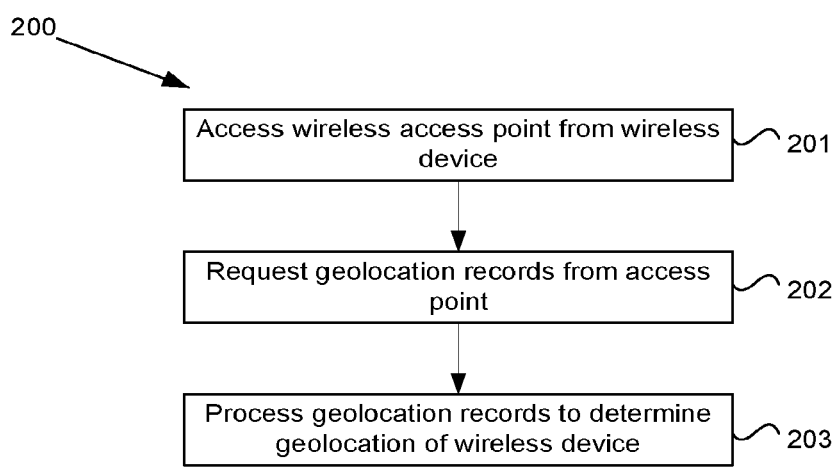
FIG. 3 depicts a method for determining a geolocation of a wireless device using geolocation information provided from an access point.

As shown in the flowchart 200 of FIG. 3, a wireless device such as a transient data client 16 may access the access point 12 (step 201) to request geolocation records (step 202). At step 203, the transient data client 16 processes the geolocation records to determine the geolocation of the transient data client 16.

The network device 12 records geolocation information from location-aware devices that are occasionally "nearby" and is able to store and retrieve a history of such geolocation information. In addition to providing the geolocation record history, the network device 12 may also provide a collection of services that use the geolocation history to produce location-related information upon request from a "nearby" device.

As shown in FIG. 1, the access point 12 is able to support a web browser 17 and includes a location history manager service 13 that can be invoked by sending a URL to the Web browser 17. The location history manager 13 is configured to store data pertaining to geolocation information in a geolocation record and to write the record to storage 15. The storage 15 may be provided within the access point 12, or alternatively, the storage 15 may be provided remotely from the access point 12 and be accessible by the access point 12 through a suitable communications link (not shown).

The browser 17 supports receiving from a transient data source 14 a URL containing a GPS coordinate, timestamp, and sender id, which the browser passes to the Location History Manager service 13. The Location History Manager 13 stores data in a collection of records in storage 15, where each record contains the GPS coordinate, timestamp, and sender id provided by various transient data sources 14. The Location History Manager processes the URL to extract the geolocation information, which is then formatted as a Geolocation record and stored. Any transient data client 16 can, via the Web browser, send a URL asking the Location History Manager for one or more geolocation information records, which the Location History Manager returns. The geolocation information can be provided from the access point 12 to the transient data client 16 as raw information, i.e. as the geolocation records, or as processed information, e.g. in the form of a calculated geolocation.

Neither the transient data source 14 nor the transient data client 16 need to be running a specific application. The application retrieving the Geolocation record need only understand the record's format. The application sends a URL to the Location History Manager via the Web browser, and the result is returned as a well-formed Web page, which the application processes to extract the Geolocation record(s). The use of a web browser to send the geolocation records is advantageous because many WiFi access points already contain a Web server. A web browser also serves as a well known API to the Location History Manager, including many libraries able to form the URL and parse the returned Web page's HTML. Other alternatives will be apparent to a person skilled in the art. For example, a similar mechanism is to use a Web service API, where the arguments and results are frequently encoded in XML.

The access point 12 may use the location history records to calculate the approximate location of the access point. In one embodiment, the geolocation of the access point 12 may be calculated by retrieving the most recent geolocation records from the database 15 and processing the geolocation records to infer the access point's 12 location. The geolocation may be based on the most recent geolocation record, or an average of the "x" most recent geolocation records where "x" is a predetermined number, e.g. 10, or "x" is determined by a time limit, e.g. the records received within the last 30 minutes. In one embodiment, the location history manager 13 may process the geolocation records to infer a trajectory of the access point.

In one embodiment, the geolocation records may include a measure of the signal strength of a communication between the respective transient data source 14 and the access point 12. The calculation of the geolocation of the access point may therefore be based on the indicated location of one or more transient data sources 14 coupled with the recorded signal strength which provides an indication of the distance between the transient data source 14 and the access point 12. The signal strength also aids in computing any error in the location. For example, a high signal strength will indicate that the access point 12 is within a closer vicinity of the transient data source 14 than a weaker signal strength. The error can be reduced by combining multiple geolocation records coupled with multiple signal strengths from multiple antennas.

In one embodiment, the access point 12 may calculate the (approximate) location of a transient data client 16, especially when the TC contains no native GPS capability. The calculated location may then be passed to the transient data client 16 for use in location based services. In one embodiment, the transient data client's 16 location may be based on a calculated location of the access point coupled with a signal strength of a communication between the access point 12 and the transient data client.

In an alternative embodiment, the transient data client 16 can request geolocation records from the access point 12 and use the retrieved geolocation records to internally calculate the transient data client's own location. The location may be calculated using the access point based methods described above, including incorporating a signal strength between the transient data client 16 and the access point 12.

Additional services can also be produced based on the geolocation records. In one embodiment, the geolocation records can be used to determine the number and direction of travel of the passing transient clients, in particular if the access point 12 is stationary. That is, an access point can track a transient data source 14 by receiving multiple geolocation records from the particular data source. If the access point 12 is mobile, the geolocation records can be used as a history of the access point's movements past transient clients, e.g., to document a guard's movements around a campus.

GPS receivers typically fail inside a building, so retrieving a preconfigured location from one or more access points can provide a valid geolocation to mobile devices as they move inside the building. The capability supports location aware applications such as tracking residents of a senior living center, including locking exterior doors when a resident who should not be outside unaccompanied approaches the exit. Similarly, a mobile device carried by a person with a mental condition leading to an inability to navigate might "call home" if the device discovers after computing its location that it is outside a predefined boundary, even if the device is inside a building. For example, some senior living facilities have a floor to which Alzheimer patients are restricted, so being on a non-Alzheimer floor but still inside the facility can be an issue. In a further example, an autonomous vehicle inside a facility might use the above described embodiments to locate itself, e.g., an automated mail cart, or a self-propelled warehouse pallet.

In addition to retrieving the location records from the Location History Manager, a transient data client 16 can invoke services offered by the access point 12. For example, based on the records stored by the Location History Manager and provided to the transient data client 16, the transient data client 16 can compute, display and provide the current location and the estimated error. The transient data client 16 can also compute and provide how frequently the transient data client 16 passes the access point 12.

The above described embodiments enable geolocation information to be used by devices that are otherwise unable to access geolocation records, thereby enabling geolocation-related services that the device would otherwise not have available.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
    receiving a first at least one URL comprising a geolocation coordinate and a sender identifier from one or more first wireless devices into a wireless network access point;
    storing the geolocation coordinate and the sender identifier in a memory of the wireless network access point;
    receiving a second URL requesting the geolocation coordinate;
    providing the first at least one URL from a web browser to the one or more first wireless devices; and
    processing one or more geolocation records associated with the web browser by the one or more first wireless devices to determine a geolocation for the wireless network access point.

2. The method of claim 1 comprising at least one of:
    providing the at least one URL from the wireless network access point to a second wireless device; and
    processing the provided at least one URL in the second-wireless device to determine a geolocation of the second wireless device.

3. The method of claim 2 comprising determining an error in the geolocation of the second wireless device from a signal strength between the second wireless device and the wireless network access point.

4. The method of claim 1 comprising processing the one or more geolocation records in the wireless network accesspoint to determine a geolocation of the wireless network access point.

5. The method of claim 4 comprising at least one of:
    determining a signal strength between the wireless network access point and the one or more first wireless devices; and
    storing the signal strength in a geolocation record corresponding to the respective one or more firstwireless device.

6. The method of claim 5 comprising processing the signalstrengths of the one or more geolocation records to determine an error in geolocation of the wireless network access point.

7. The method of claim 1 comprising recording a signal strength of a communication with the one or more first wireless devices into a geolocation record corresponding to the one or more first wireless devices.

8. The method of claim 7 comprising determining an error in the geolocation using the signal strength of the one or more geolocation records.

9. The method of claim 1 comprising processing the one or more geolocation records to track movement of thewireless network access point.

10. The method of claim 1, wherein the wireless network access point provides wireless network service to the one or more first wireless devices.

11. The method of claim 1, comprising receiving at least one timestamp from the one or more first wireless devices.

12. A wireless access point configured to provide wireless network access to one or more wireless devices comprising one or more transient data sources and one or more transient data clients, the wireless access point comprising a web browser configured to:
    receive, from the one or more transient data sources, a geolocation coordinate from one or more first wireless devices into the wireless network access point that provides wireless network service to the one or more first wireless devices;
    retrieve one or more geolocation records associated with the web browser in response to a request from the one or more transient data clients; and
    process the retrieved one or more geolocation records to determine a geolocation of the one or more transient data clients.

13. The wireless access point of claim 12 wherein a location history manager is configured to provide at least one of:
    receive a URL from the one or more transient datasources that comprises a timestamp from the one or more first wireless devices; and
    store the timestamp in the geolocation record.

14. The wireless access point of claim 12 wherein thelocation history manager is configured to receive the request from the one or more transient data clients.

15. The wireless access point of claim 14 wherein the location history manager is configured to provide the retrieved geolocation records to the one or more transient data clients.

16. The wireless access point of claim 12 wherein the location history manager is configured to provide the geolocation of the one or more transient data clients to the one or more transient data clients.

17. The wireless access point of claim 12 wherein the location history manager is configured to process the one or more geolocation records to track the movement of the wireless access point.

18. A method, comprising:
   requesting one or more URLs from a wireless access point, the one or more URLs comprising geolocation information and a sender identifier received from at least one mobile device to which the wireless access point provided wireless network service, the wireless access point storing the geolocation coordinate and the sender identifier in a memory of the wireless access point;
   receiving the one or more URLs from the wireless access point; and
   processing the one or more URLs by a wireless device to calculate a geolocation of the wireless device.

19. The method of claim 18 comprising processing a signal strength between the wireless access point and the wireless device to determine an error of the geolocation.

20. The method of claim 18 comprising retrieving the one or more URLs from a URL history manager of the wireless access point.

* * * * *